(12) United States Patent
Baek et al.

(10) Patent No.: US 8,795,860 B2
(45) Date of Patent: Aug. 5, 2014

(54) SECONDARY BATTERY PACK OF NOVEL STRUCTURE

(75) Inventors: JuHwan Baek, Chungcheongbuk-do (KR); Sangkwon Nam, Cheongju-si (KR); Tae-Wook Kim, Chungcheongbuk-do (KR); Jinhyun Ryu, Cheongju-si (KR)

(73) Assignee: LG Chem, Ltd., Seoul (KR)

( * ) Notice: Subject to any disclaimer, the term of this patent is extended or adjusted under 35 U.S.C. 154(b) by 245 days.

(21) Appl. No.: 13/318,453

(22) PCT Filed: May 7, 2010
(Under 37 CFR 1.47)

(86) PCT No.: PCT/KR2010/002893
§ 371 (c)(1),
(2), (4) Date: May 11, 2012

(87) PCT Pub. No.: WO2010/128812
PCT Pub. Date: Nov. 11, 2010

(65) Prior Publication Data
US 2012/0276420 A1    Nov. 1, 2012

(30) Foreign Application Priority Data
May 8, 2009 (KR) .................. 10-2009-0040436

(51) Int. Cl.
*H01M 2/02* (2006.01)
*H01M 10/42* (2006.01)

(52) U.S. Cl.
USPC .................................. 429/7; 429/61; 429/177

(58) Field of Classification Search
USPC ................... 429/7, 61, 65, 177; 29/623.4
See application file for complete search history.

(56) References Cited

U.S. PATENT DOCUMENTS

| 8,268,463 B2 * | 9/2012 | Choi ................................. 429/7 |
| 2002/0142195 A1 | 10/2002 | Ehara |
| 2004/0251872 A1 | 12/2004 | Wang et al. |
| 2008/0233472 A1 | 9/2008 | Ota et al. |

FOREIGN PATENT DOCUMENTS

| JP | 2003-22790 A | 1/2003 |
| JP | 2008-130549 A | 6/2008 |
| JP | 2009-70736 A | 4/2009 |
| JP | 2009-99542 A | 5/2009 |
| KR | 10-2006-0032591 A | 4/2006 |
| KR | 10-0723668 B1 | 5/2007 |
| KR | 10-2007-0072426 A | 7/2007 |
| WO | WO 2008/050955 A1 | 5/2008 |
| WO | WO 2008/066287 A1 | 6/2008 |

OTHER PUBLICATIONS

PCT/ISA/210—International Search Report dated Dec. 8, 2010 issued for PCT/KR2010/002893.

* cited by examiner

*Primary Examiner* — Barbara Gilliam
*Assistant Examiner* — Stephan Essex
(74) *Attorney, Agent, or Firm* — Birch, Stewart, Kolasch & Birch, LLP

(57) ABSTRACT

Disclosed herein is a secondary battery pack including a battery cell having a first electrode terminal, a second electrode terminal and a pair of coupling grooves formed at the top of a battery case, a protection circuit module (PCM) including a protection circuit board (PCB), connection members A and B connected to the first electrode terminal and the second electrode terminal, respectively, and a safety element, and an electrically insulated top cap having through holes communicating with the respective coupling grooves.

16 Claims, 4 Drawing Sheets

SECONDARY BATTERY PACK OF NOVEL STRUCTURE

TECHNICAL FIELD

The present invention relates to a secondary battery pack of a novel structure, and, more particularly, to a secondary battery pack including a battery cell configured to have a structure in which an electrode assembly of a cathode/separator/anode structure is mounted in a battery case together with an electrolyte in a sealed state, the battery case is provided at the top thereof with a first electrode terminal, a second electrode terminal and a pair of coupling grooves, a metal clad is attached to the first electrode terminal, and the second electrode terminal protrudes from the center of the top of the battery case, a protection circuit module (PCM) including a protection circuit board (PCB) having a protection circuit formed thereon, connection members A and B connected to the first electrode terminal and the second electrode terminal, respectively, and a safety element, and an electrically insulated top cap mounted to the top of the battery cell so as to surround the PCM, the top cap having through holes communicating with the respective coupling grooves, wherein one end of the connection member A is coupled to a terminal connection part formed at the bottom of the PCB, a connection portion of the connection member B connected to the second electrode terminal of the battery cell is located at the bottom of the PCB, the connection member B being electrically connected to the second electrode terminal via the safety element, coupling members are coupled into the respective coupling grooves of the battery cell through the through holes of the top cap in a state in which the PCM and the top cap are disposed at the top of the battery cell, one end of the connection member A bent perpendicularly to the other end of the connection member A coupled to the terminal connection part formed at the bottom of the PCB being electrically connected to the first electrode terminal by welding, and an insulation tape is attached to the bottom of the PCB in a state in which portions of the connection members A and B connected to the electrode terminals of the battery cell are exposed, the PCM and the insulation tape being mounted in the top cap.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as for the mobile devices.

However, various combustible materials are contained in the lithium secondary battery. As a result, there is a possibility of danger in that the lithium secondary battery may overheat or explode due to overcharge, overcurrent or other external physical impact. In other words, the lithium secondary battery has low safety. Consequently, safety elements, such as a positive temperature coefficient (PTC) element and a protection circuit module (PCM), to effectively control an abnormal state of the lithium secondary battery, such as overcharge or overcurrent, are mounted in the lithium secondary battery in a state in which the safety elements are connected to a battery cell of the lithium secondary battery.

Generally, the PCM is connected to the battery cell via conductive nickel plates by welding or soldering. That is, nickel plates are connected to electrode tabs of the PCM by welding or soldering, the nickel plates are connected to electrode terminals of the battery cell by welding or soldering so that the PCM is connected to the battery cell, and an insulative top cap is fitted onto the top of the battery cell, thereby manufacturing a battery pack.

It is necessary for safety elements, including such a PCM, to be maintained in electrical connection with electrode terminals of a battery cell and, at the same time, to be electrically isolated from other parts of the battery cell. A plurality of insulative mounting members is necessary to achieve such connection with the result that a process of assembling a battery pack is complicated, and the size of a space to receive the battery cell is reduced.

Also, the aforementioned method of connecting the PCM to the battery cells via the nickel plates and coupling the insulative top cap to the top of the battery cell to manufacture the battery pack is constituted by successive processes. For this reason, defects at one process are connected to defects at another process with the result that it is difficult to reduce a defect ratio and to manufacture a battery pack through outsourcing.

Consequently, there is a high necessity for technology to integrate components, such as a PCM, a top cap and insulative mounting members while maximally utilizing a conventional battery cell and a conventional assembly method, thereby improving quality of a battery pack, to achieve stable coupling between members disposed at the top of the battery cell, and to increase the capacity of the battery cell.

DISCLOSURE

Technical Problem

Therefore, the present invention has been made to solve the above problems, and other technical problems that have yet to be resolved.

Specifically, it is an object of the present invention to provide a secondary battery pack configured to have a structure in which members mounted at the top of a battery cell are integrated, thereby simplifying a battery pack assembly process and reducing manufacturing costs of the battery pack.

It is another object of the present invention to provide a secondary battery pack configured to have a structure in which the battery pack is manufactured maximally using a conventional battery cell and a conventional assembly method and quality and stability of the battery pack are improved.

Technical Solution

In accordance with one aspect of the present invention, the above and other objects can be accomplished by the provision of a secondary battery pack including a battery cell configured to have a structure in which an electrode assembly of a cathode/separator/anode structure is mounted in a battery case together with an electrolyte in a sealed state, the battery case is provided at the top thereof with a first electrode terminal, a second electrode terminal and a pair of coupling grooves, a metal clad is attached to the first electrode terminal, and the second electrode terminal protrudes from the center of the top of the battery case, a protection circuit module (PCM) including a protection circuit board (PCB) having a protection circuit formed thereon, connection members A and B connected to the first electrode terminal and the second electrode terminal, respectively, and a safety element, and an electrically insulated top cap mounted to the top of the battery cell so as to surround the PCM, the top cap having through holes communicating with the respective coupling grooves, wherein one end of the connection member A is coupled to a terminal connection part formed at the bottom of the PCB, a connection portion of the connection member B connected to the second electrode terminal of the battery cell is located at the bottom of the PCB, the connection member B being electrically connected to the second electrode terminal via the safety element, coupling members are coupled into the respective coupling grooves of the battery cell through the through holes of the top cap in a state in which the PCM and the top cap are disposed at the top of the battery cell, one end of the connection member A bent perpendicularly to the other end of the connection member A coupled to the terminal connection part formed at the bottom of the PCB being electrically connected to the first electrode terminal by welding, and an insulation tape is attached to the bottom of the PCB in a state in which portions of the connection members A and B connected to the electrode terminals of the battery cell are exposed, the PCM and the insulation tape being mounted in the top cap.

That is, in the secondary battery pack according to the present invention, one end of the connection member A bent perpendicularly to the other end of the connection member A coupled to the terminal connection part formed at the bottom of the PCB is electrically connected to the first electrode terminal by welding, thereby preventing the occurrence of a phenomenon in which connection portions are broken during dropping testing and thus improving quality and stability of the battery pack.

Also, the connection member B is electrically connected to the second electrode terminal via the safety element, thereby improving safety of the battery pack. In addition, it is possible to greatly improve manufacturing processability of the battery pack without greatly changing the structure of the battery cell.

In a general process of assembling a battery pack, as previously described, the connection members, the insulative mounting member and the PCM constituting the PCM assembly are sequentially coupled to or disposed at the battery cell, and the top cap is mounted to the battery cell. In this way, the PCM assembly is mounted to the battery cell. Consequently, a plurality of welding or soldering processes and a plurality of mounting operations are required to mount the PCM assembly to the battery cell. As a result, a defect ratio is high and, in addition, a space for assembly and disposition is required.

In the secondary battery pack according to the present invention, on the other hand, the connection members A and B are connected, bent and coupled to the battery cell through the coupling members in a state in which the PCM and the insulation tape are mounted in the top cap, thereby greatly reducing a defect ratio of the connected portions and greatly simplifying the battery pack manufacturing process.

In addition, the insulation tape is attached to the bottom of the PCB in a state in which the portions of the connection members A and B connected to the electrode terminals of the battery cell are exposed. Consequently, it is possible to maintain electrical insulation between the remaining portions of the connection members A and B excluding the portions of the connection members A and B connected to the electrode terminals of the battery cell and the PCB by the insulation tape.

Also, the thickness of the insulation tape is less than that of a conventional insulative mounting member. Consequently, it is possible to minimize a disposition space at the top of the battery cell, to improve ease of operation and to reduce manufacturing costs.

It is required for the battery case to be easily manufactured and to exhibit a mechanical strength above a predetermined level. For this reason, the battery case may be a metal container, preferably an aluminum container or a stainless steel container.

In a preferred example, the first electrode terminal may be a cathode terminal and the second electrode terminal may be an anode terminal. For example, a prismatic battery cell may be configured to have a structure in which an electrode terminal protruding from the top of the battery cell and a battery case form an anode terminal and a cathode terminal, respectively, and an insulative member, such as a gasket, is interposed therebetween, thereby achieving insulation from each other. In such a prismatic battery cell, therefore, the first electrode terminal may be the top of the battery case, i.e. the cathode terminal, and the second electrode terminal may be the anode terminal protruding from the top of the battery case.

Preferably, the coupling grooves are located at opposite ends of the top of the battery case. One of the coupling grooves may be formed at the first electrode terminal. Alternatively, both of the two coupling grooves may be formed at the first electrode terminal.

The perpendicularly bent end of the connection member A may be formed in a planar shape of ']'.

Meanwhile, the coupling (electrical connection) between the connection member A and the PCB may be achieved in various manners. Preferably, the connection member A is coupled to the bottom of the PCB by soldering.

In a concrete example, the connection member A may include a PCB coupling part coupled to the terminal connection part of the PCB and a battery cell coupling part bent perpendicularly to the PCB coupling part and coupled to the top of the battery cell.

In the above structure, the PCB coupling part is coupled to the terminal connection part formed at the bottom of the PCB by soldering, and the battery cell coupling part is coupled to the top of the battery cell by spot welding. Consequently, it is possible to increase coupling force between the connection member A and the battery cell coupling part.

In another concrete example, a connection terminal connected to the second electrode terminal may be formed at a position of the bottom of the PCB opposite to the connection member A, and the connection member B coupled to the second electrode terminal by welding may be electrically connected to the connection terminal via the safety element. In this structure, the connection member B, included in the PCM together with the safety element, is coupled to the second electrode terminal of the battery cell by welding in a state in which the connection member B is mounted in the insulative cap, thereby achieving electrical connection therebetween. The connection member B is bent so that the connection member is mounted at the top of the battery cell.

In an example, the safety element may be an element, resistance of which increases according to the increase in temperature, preferably a positive temperature coefficient (PTC) element. The connection member B coupled to the PTC element functions to interrupt the supply of electric current at the top of the battery pack when the interior temperature of the battery pack abruptly increases due to an internal short circuit.

In particular, in the secondary battery pack according to the present invention, the PTC element is directly connected to the connection member B located on the circuit between the battery cell and the PCB. Therefore, the PTC element more sensitively responds to the temperature of the battery cell, thereby greatly improving the safety of the battery pack.

Materials for the connection member A and the connection member B are not particularly restricted so long as the connection member A and the connection member B are formed of a conductive material. For example, the connection member A and the connection member B may be made of nickel plates.

Preferably, in the structure in which the insulation tape is attached to the bottom of the PCB as previously described, the insulation tape is attached to the remaining portion excluding the battery cell coupling part of the connection member A facing the first electrode terminal and one surface of the connection member B facing the second electrode terminal. Consequently, it is possible to stably achieve electrical connection between the electrode terminals of the battery cell and the PCB while maintaining an overall insulated state.

Various coupling members may be coupled into the coupling grooves of the battery cell through the through holes of the top cap. For example, the coupling members may be screws, to which, however, the coupling members are not limited.

The top cap is coupled to the top of the battery cell through the above coupling, thereby easily achieving assembly of the battery pack and securing more stable coupling.

In a state in which the coupling members are fitted in the through holes, a bonding agent may be injected into the through holes of the top cap. Alternatively, a sealing member may be inserted into the through holes of the top cap.

In addition to the insulative top cap coupled to the top of the battery cell, an additional insulative bottom cap may be mounted to the bottom of the battery cell and a sheathing film may be attached to the outside of the battery case of the battery cell. Consequently, it is possible to protect the battery cell against external impact and to maintain the electrical insulation of the battery cell.

In the secondary battery pack according to the present invention, any battery cells may be used in various manners irrespective of the kind and shape of the battery cells. A prismatic lithium secondary battery cell is preferably used.

In accordance with another aspect of the present invention, there is provided a protection circuit module (PCM) assembly mounted to a battery cell configured to have a structure in which an electrode assembly of a cathode/separator/anode structure is mounted in a battery case together with an electrolyte in a sealed state, the battery case is provided at the top thereof with a first electrode terminal, a second electrode terminal and a pair of coupling grooves, the PCM assembly including a PCM including a protection circuit board (PCB) having a protection circuit formed thereon, connection members A and B to be connected to the first electrode terminal and the second electrode terminal, respectively, and a safety element, and an electrically insulated top cap to be mounted to the top of the battery cell in a state in which the PCM is mounted in the top cap, the top cap having through holes communicating with the respective coupling grooves, wherein one surface of the connection member A is coupled to a terminal connection part formed at the bottom of the PCB, a connection portion of the connection member B to be connected to the second electrode terminal of the battery cell is located at the bottom of the PCB, the connection member B being electrically connected to the second electrode terminal via the safety element, and an insulation tape is attached to the bottom of the PCB in a state in which portions of the connection members A and B to be connected to the electrode terminals of the battery cell are exposed, the PCM and the insulation tape being mounted in the top cap.

In the PCM assembly according to the present invention, therefore, the connection members A and B are connected, bent and coupled to the battery cell through the coupling members in a state in which the PCM and the insulation tape are mounted in the top cap, thereby greatly reducing a defect ratio of the connected portions and greatly simplifying the battery pack manufacturing process.

The PCM assembly is new in the art to which the present invention pertains.

In accordance with a further aspect of the present invention, there is provided a method of manufacturing a secondary battery pack including (a) coupling a connection member B to one side of a safety element and attaching an insulation tape to the opposite side of the safety element, (b) coupling the other side of the safety element to the bottom of a protection circuit board (PCB) having a protection circuit formed thereon, (c) coupling one end of a connection member A to a terminal connection part formed at the bottom of the PCB by soldering to manufacture a protection circuit module (PCM), (d) mounting the PCM in an insulative top cap, (e) attaching an insulation tape to the bottom of the PCM at the remaining portion excluding a portion of the connection member A to be connected to a first electrode terminal of a battery cell and a portion of the connection member B to be connected to a second electrode terminal of the battery cell, (f) coupling the connection member A and the connection member B to the first electrode terminal and the second electrode terminal, respectively, by welding and bending the connection member A and the connection member B to mount a top cap to the top of the battery cell, (g) coupling the top cap to the battery cell by screw coupling, (h) coupling an insulative bottom cap to the bottom of the battery cell by bonding, (i) injecting a bonding agent or inserting a sealing member into through holes of the top cap, the through holes of the top cap being configured to have a screw coupling structure, and (j) wrapping the outside of the battery pack with a sheathing film.

The PCM, the insulation tape and the top cap are integrated through steps (a) to (e) as compared with a conventional method of manufacturing a secondary battery pack. Consequently, it is possible to manufacture the secondary battery pack through outsourcing, to improve mechanical test performance of the battery pack and to reduce process difficulty, thereby manufacturing a more compact battery pack.

Advantageous Effects

As is apparent from the above description, the secondary battery pack according to the present invention is configured to have a structure in which the members mounted at the top of the battery cell are integrated, thereby simplifying a battery pack assembly process and reducing manufacturing costs of the battery pack. Also, the battery pack is manufactured maximally utilizing a conventional battery cell and a conventional assembly method, and quality and stability of the battery pack are improved.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
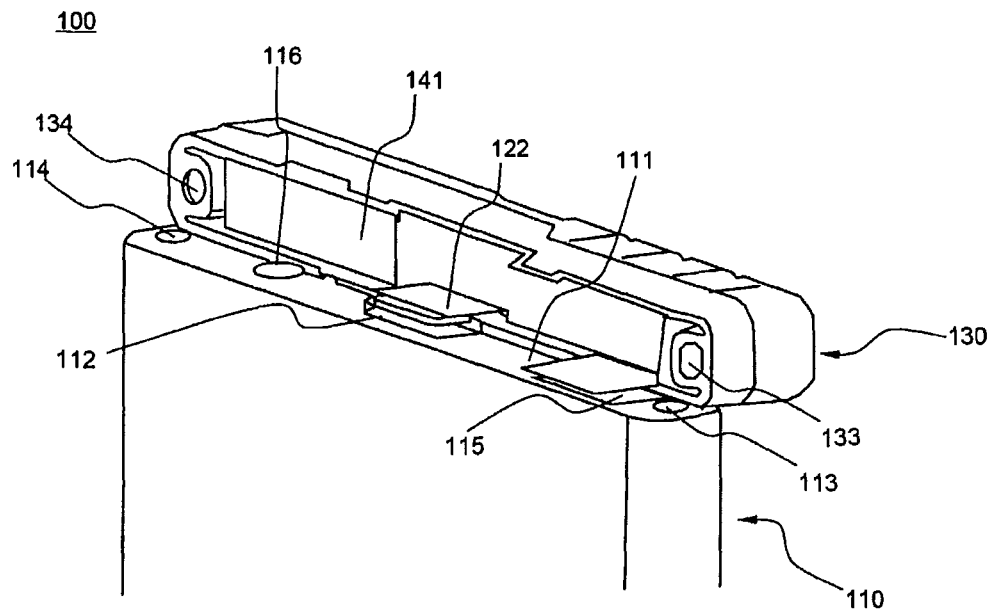
FIG. 1 is an exploded perspective view illustrating the top of a battery cell and an insulative top cap according to an embodiment of the present invention.
Figure 2:
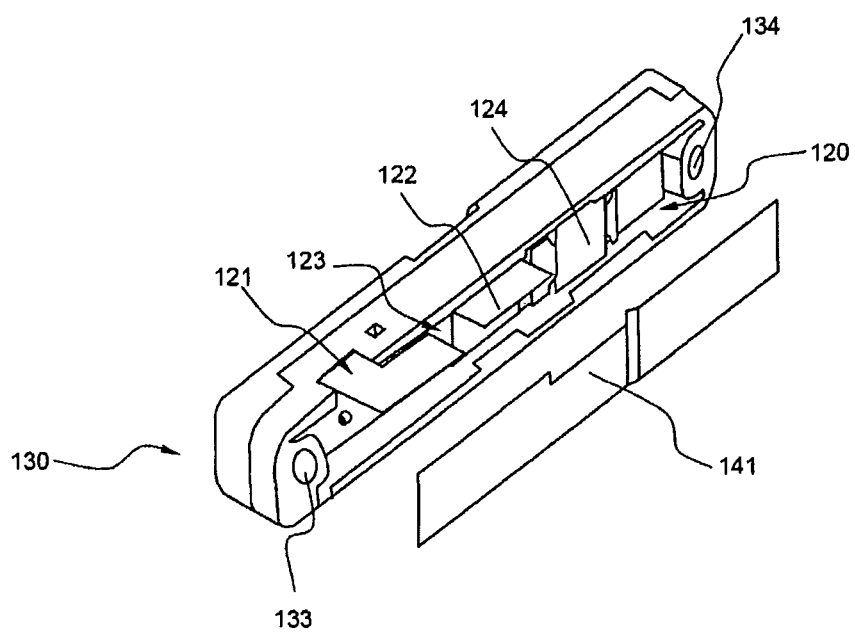
FIG. 2 is a typical view illustrating a protection circuit module (PCM) and an insulation tape mounted in the top cap.

FIG. 1 is an exploded perspective view illustrating the top of a battery cell and an insulative top cap according to an embodiment of the present invention, and FIG. 2 is a typical view illustrating a protection circuit module (PCM) and an insulation tape mounted in the top cap.

Referring to these drawings, a secondary battery pack 100 includes a battery cell 110, a protection circuit module (PCM) 120 and a top cap 130 mounted to the top of the battery cell 110 so that the top cap 130 surrounds the PCM 120.

The battery cell 110 is configured to have a structure in which an electrode assembly is mounted in a battery case together with an electrolyte in a sealed state and in which a cathode terminal 111, an anode terminal 112 and a pair of coupling holes 113 and 114 are formed at the top of the battery case. Also, a metal clad 115 is attached to the upper end of the cathode terminal 111.

The PCM 120 includes a protection circuit board (PCB) 123 having a protection circuit formed thereon, connection members 121 and 122 connected to the cathode terminal 111 and the anode terminal 112, respectively, and a positive temperature coefficient (PTC) element 124.

The top cap 130 is formed of an electrically insulative material. The top cap 130 is provided at opposite ends thereof with through holes 133 and 134 communicating with the coupling grooves 113 and 114, respectively.

Also, an insulation tape 141 is attached to the bottom of the PCB 123 in a state in which a portion of the connection member A 121 connected to the cathode terminal 111 and a portion of the connection member B 122 connected to the anode terminal 112 are exposed, and the PCM 120 and the insulation tape 141 are mounted in the top cap 130.

The anode terminal 112, protruding upward in a state in which the anode terminal 112 is isolated from a battery case formed of a metal container, is formed at the top of the battery cell 110, and the remaining portion excluding the anode terminal 112 constitutes the cathode terminal 111. The battery cell 110 is provided at one side of the top thereof with an electrolyte injection port 116, which is sealed by a metal ball or a polymer resin.

Figure 3:
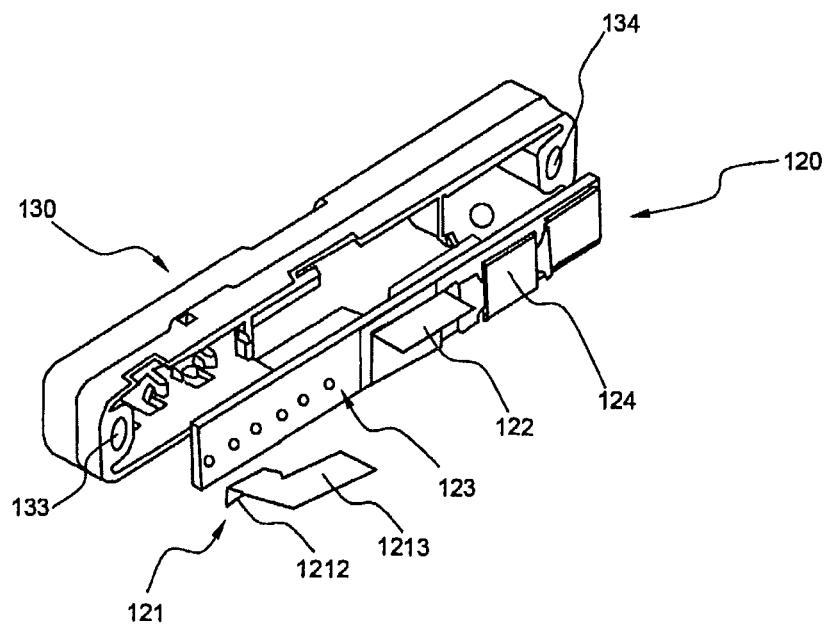
FIG. 3 is an exploded perspective view of FIG. 2.
Figure 4:
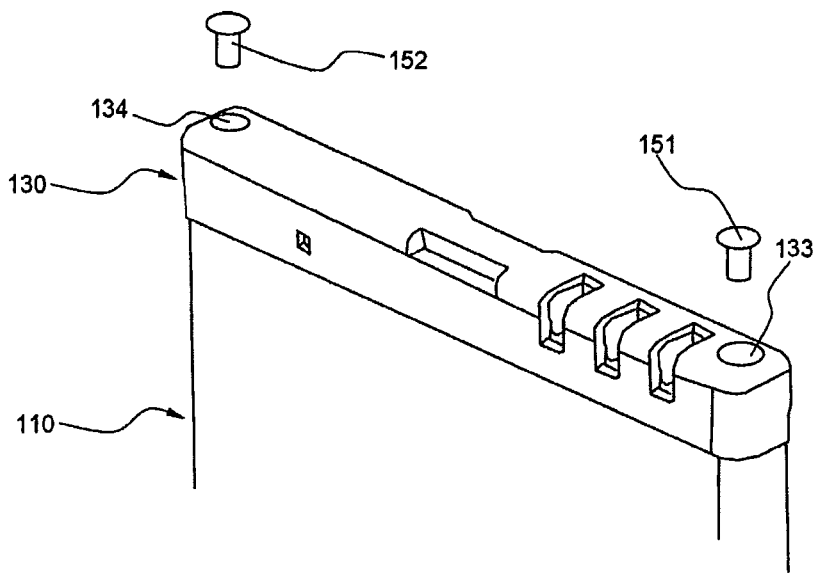
FIG. 4 is a typical view illustrating the insulative top cap and coupling members mounted to the top of the battery cell.
Figure 5:
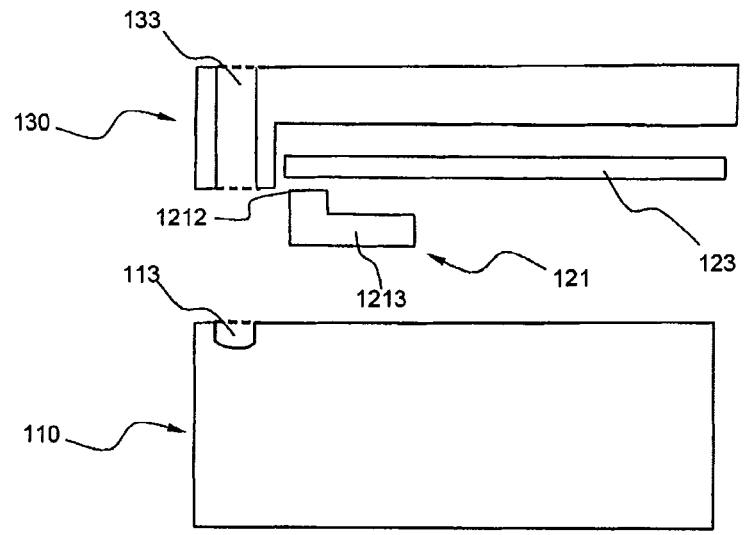
FIG. 5 is a vertical partial sectional view typically illustrating a connection member A of FIG. 1.

FIG. 3 is an exploded perspective view of FIG. 2, FIG. 4 is a typical view illustrating the insulative top cap and coupling members mounted to the top of the battery cell, and FIG. 5 is a vertical partial sectional view typically illustrating the connection member A of FIG. 1 coupled to the battery cell.

Referring to these drawings together with FIG. 1, the connection member A 121 includes a PCB coupling part 1212 coupled to a terminal connection part (not shown) of the PCB and a battery cell coupling part 1213 bent perpendicularly to the PCB coupling part 1212 and coupled to the top of the battery cell. The battery cell coupling part 1213, i.e. the perpendicularly bent end of the connection member A 121, is formed in a planar shape of ']'.

Also, the PCT coupling part 1212 is coupled to the terminal connection part formed at the bottom of the PCB 123 by soldering, and the battery cell coupling part 1213 is coupled to the metal clad 115 attached to the top of the battery cell by spot welding.

The coupling members 151 and 152 are coupled into the coupling grooves 113 and 114 of the battery cell 110 through the through holes 133 and 134 of the top cap 130 in a state in which the PCM 120 and the top cap 130 are disposed at the top of the battery cell 110.

Figure 6:
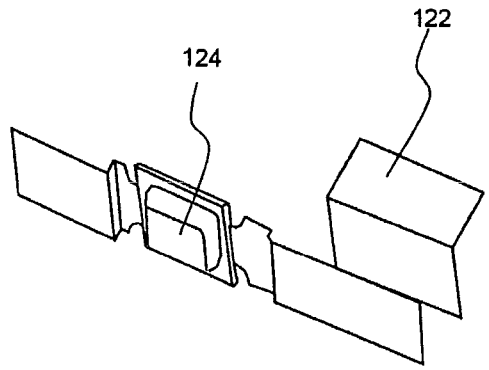
FIG. 6 is an exploded perspective view illustrating a positive temperature coefficient (PTC) element and a connection member B.
Figure 7:
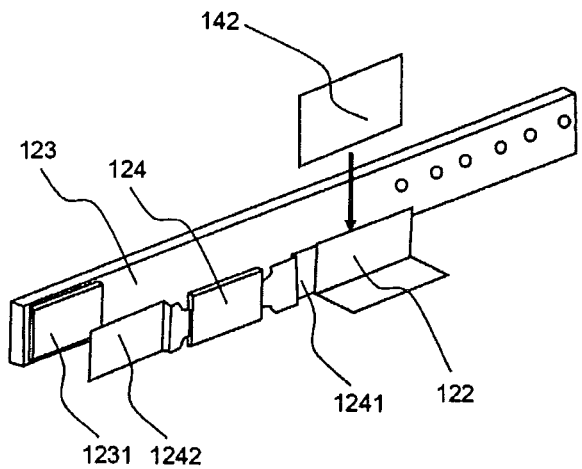
FIG. 7 is an exploded perspective view illustrating the positive temperature coefficient (PTC) element in which the connection member B is coupled to the bottom of a protection circuit board (PCB) and the insulation tape.

FIG. 6 is an exploded perspective view typically illustrating the PTC element and the connection member B, and FIG. 7 is an exploded perspective view typically illustrating the PTC element in which the connection member B is coupled to the bottom of the PCB and the insulation tape.

Referring to these drawings together with FIG. 1, the connection member B 122 is coupled to one surface 1241 of the PTC element 124 by welding, an insulation tape 142 is attached to the opposite surface of the PTC element 124, i.e. the bottom of the PCB 123, and the other surface 1242 of the PTC element 124 is coupled to the bottom 1231 of the PCB 123 by welding.

That is, the insulation tape is attached to one surface of the connection member B 122 connected to the anode terminal 112, and the PCB 123 is electrically connected to the anode terminal 112 of the battery cell 110 via the PTC element 124.

Figure 8:
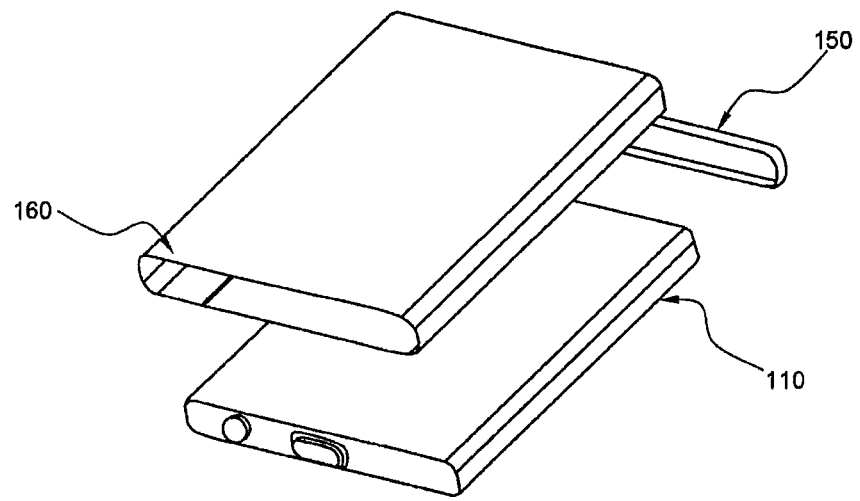
FIG. 8 is an exploded perspective view illustrating the battery cell, a bottom cap and a sheathing film.

FIG. 8 is an exploded view typically illustrating the battery cell, an insulative bottom cap and a sheathing film.

Referring to FIG. 8, an insulative bottom cap 150 is coupled to the bottom of the battery cell 110 and a sheathing film 160 is attached to the outside of the battery case of the battery cell 110 so that the sheathing film 160 wraps the outside of the battery case of the battery cell 110.

The sheathing film 160 is attached to the outside of the battery case to maintain electrical insulation of the battery cell 110 from the outside and to display product information. The sheathing film 160, made of a thermally shrinkable material, is formed in the shape of a tube. The sheathing film 160 is disposed so as to wrap the battery cell 110, and then heat is applied to the sheathing film 160 so that the sheathing film 160 shrinks and comes into tight contact with the outside of the battery case of the battery cell 110.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
   a battery cell configured to have a structure in which an electrode assembly of a cathode/separator/anode structure is mounted in a battery case together with an electrolyte in a sealed state, the battery case is provided at the top thereof with a first electrode terminal, a second electrode terminal and a pair of coupling holes, a metal clad is attached to the first electrode terminal, and the second electrode terminal protrudes from the center of the top of the battery case;
   a protection circuit module (PCM) comprising a protection circuit board (PCB) having a protection circuit formed thereon, connection members A and B connected to the first electrode terminal and the second electrode terminal, respectively, and a safety element; and an electrically insulated top cap mounted to the top of the battery cell so as to surround the PCM, the top cap having through holes communicating with the respective coupling holes, wherein one end of the connection member A is coupled to a terminal connection part formed at the bottom of the PCB, a connection portion of the connection member B connected to the second electrode terminal of the battery cell is located at the bottom of the PCB, the connection member B being electrically connected to the second electrode terminal via the safety element, coupling members are coupled into the respective coupling holes of the battery cell through the through holes of the top cap in a state in which the PCM and the top cap are disposed at the top of the battery cell, one end of the connection member A bent perpendicularly to the other end of the connection member A coupled to the terminal connection part formed at the bottom of the PCB being electrically connected to the first electrode terminal by welding, and an insulation tape is attached to the bottom of the PCB in a state in which portions of the connection members A and B connected to the electrode terminals of the battery cell are exposed, the PCM and the insulation tape being mounted in the top cap.

2. The secondary battery pack according to claim 1, wherein the battery case is a metal container.

3. The secondary battery pack according to claim 1, wherein the first electrode terminal is a cathode terminal and the second electrode terminal is an anode terminal.

4. The secondary battery pack according to claim 1, wherein the coupling holes are located at opposite ends of the top of the battery case.

5. The secondary battery pack according to claim 1, wherein the perpendicularly bent end of the connection member A is formed in a planar shape of ']'.

6. The secondary battery pack according to claim 1, wherein the connection member A comprises a PCB coupling part coupled to the terminal connection part of the PCB and a battery cell coupling part bent perpendicularly to the PCB coupling part and coupled to the top of the battery cell.

7. The secondary battery pack according to claim 6, wherein the PCB coupling part is coupled to the terminal connection part formed at the bottom of the PCB by soldering, and the battery cell coupling part is coupled to the top of the battery cell by spot welding.

8. The secondary battery pack according to claim 1, wherein a connection terminal connected to the second electrode terminal of the battery cell is formed at a position of the bottom of the PCB opposite to the connection member A, and the connection member B coupled to the second electrode terminal by welding is electrically connected to the connection terminal via the safety element.

9. The secondary battery pack according to claim 1, wherein the safety element is a positive temperature coefficient (PTC) element.

10. The secondary battery pack according to claim 1, wherein the connection member A and the connection member B are made of nickel plates.

11. The secondary battery pack according to claim 1, wherein the insulation tape is attached to the remaining portion excluding the end of the connection member A facing the first electrode terminal and the end of the connection member B facing the second electrode terminal.

12. The secondary battery pack according to claim 1, wherein the coupling members are screws.

13. The secondary battery pack according to claim 1, further comprising a sheathing film attached to the outside of the battery case.

14. The secondary battery pack according to claim 1, wherein the battery cell is a prismatic lithium secondary battery cell.

15. A protection circuit module (PCM) assembly mounted to a battery cell configured to have a structure in which an electrode assembly of a cathode/separator/anode structure is mounted in a battery case together with an electrolyte in a sealed state, the battery case is provided at the top thereof with a first electrode terminal, a second electrode terminal and a pair of coupling holes, the PCM assembly comprising:

a PCM comprising a protection circuit board (PCB) having a protection circuit formed thereon, connection members A and B to be connected to the first electrode terminal and the second electrode terminal, respectively, and a safety element; and an electrically insulated top cap to be mounted to the top of the battery cell in a state in which the PCM is mounted in the top cap, the top cap having through holes communicating with the respective coupling holes, wherein one surface of the connection member A is coupled to a terminal connection part formed at the bottom of the PCB, a connection portion of the connection member B to be connected to the second electrode terminal of the battery cell is located at the bottom of the PCB, the connection member B being electrically connected to the second electrode terminal via the safety element, and an insulation tape is attached to the bottom of the PCB in a state in which portions of the connection members A and B to be connected to the electrode terminals of the battery cell are exposed, the PCM and the insulation tape being mounted in the top cap.

16. A method of manufacturing a secondary battery pack comprising:

(a) coupling a connection member B to one side of a safety element and attaching an insulation tape to the opposite side of the safety element;

(b) coupling the other side of the safety element to the bottom of a protection circuit board (PCB) having a protection circuit formed thereon;

(c) coupling one end of a connection member A to a terminal connection part formed at the bottom of the PCB by soldering to manufacture a protection circuit module (PCM);

(d) mounting the PCM in an insulative top cap;

(e) attaching an insulation tape to the bottom of the PCM at the remaining portion excluding a portion of the connection member A to be connected to a first electrode terminal of a battery cell and a portion of the connection member B to be connected to a second electrode terminal of the battery cell;

(f) coupling the connection member A and the connection member B to the first electrode terminal and the second electrode terminal, respectively, by welding and bending the connection member A and the connection member B to mount a top cap to the top of the battery cell;

(g) coupling the top cap to the battery cell by screw coupling;

(h) coupling an insulative bottom cap to the bottom of the battery cell by bonding;

(i) injecting a bonding agent or inserting a sealing member into through holes of the top cap, the through holes of the top cap being configured to have a screw coupling structure; and
(j) wrapping the outside of the battery pack with a sheathing film.

\* \* \* \* \*